(12) United States Patent
Bednar

(10) Patent No.: US 6,336,311 B1
(45) Date of Patent: *Jan. 8, 2002

(54) GANG-TYPE ROTARY LAWN MOWER WITH REAR ROLLER

(75) Inventor: Richard D. Bednar, Lake Mills, WI (US)

(73) Assignee: Ransomes America Corporation, Lincoln, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/546,145

(22) Filed: Apr. 10, 2000

Related U.S. Application Data

(63) Continuation of application No. 08/794,141, filed on Feb. 3, 1997, now Pat. No. 6,047,530.

(51) Int. Cl.[7] .................................................. A01D 34/66
(52) U.S. Cl. ............................................. 56/6; 56/13.6
(58) Field of Search ........................... 56/6, 7, 13.6, 13.7, 56/13.8, 255, 295, DIG. 3, DIG. 9–14

(56) References Cited

U.S. PATENT DOCUMENTS

| | | |
|---|---|---|
| 1,961,710 A | 6/1934 | Pol |
| 2,504,259 A | 4/1950 | Ford |
| 2,936,561 A | 5/1960 | Grimes |
| 3,070,938 A | 1/1963 | Winget |
| 3,118,266 A | 1/1964 | Colburn |
| 3,135,079 A | 6/1964 | Dunn |
| 4,308,713 A | 1/1982 | James |
| 4,901,507 A | 2/1990 | Cracraft |
| 5,137,100 A | 8/1992 | Scott et al. |
| 5,280,695 A | 1/1994 | Nunes, Jr. et al. |
| 5,293,729 A | 3/1994 | Curry et al. |
| 5,297,378 A | 3/1994 | Smith |
| 5,343,680 A | 9/1994 | Reichen et al. |
| 5,355,665 A | 10/1994 | Peter |
| 5,412,932 A | 5/1995 | Schueler |
| 5,423,565 A | 6/1995 | Smith |
| 5,481,857 A | 1/1996 | Umemoto et al. |
| 5,497,604 A | 3/1996 | Lonn |
| 6,047,530 A | 4/2000 | Bednar |

FOREIGN PATENT DOCUMENTS

| | | |
|---|---|---|
| EP | 0342700 | 11/1989 |
| NL | 7804519 | 8/1978 |
| WO | 88/05998 | 8/1988 |

OTHER PUBLICATIONS

Mountfield "Domestic Grass Machinery" (Date unknown).
Turf Blazer 1040 Diesel, Howard Price Turf Equipment (advertising brochure) (Date unknown).
Nunes Rotary Mower, John Deere 3364 Deck Attachment; Nunes Manufacturing, Inc. Jun. 1993.

(List continued on next page.)

*Primary Examiner*—Robert E. Pezzuto
(74) *Attorney, Agent, or Firm*—Harness, Dickey & Pierce PLC

(57) ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

12 Claims, 5 Drawing Sheets

OTHER PUBLICATIONS

"80–81 Owners Manual" published by Steiner in 1981 depicting rear roller 60 extending substantially across the width of multi–spindle cutting deck.

"Uniquely engineered for unmatched versatility" (advertising brochure) published by Steiner in 1997, p. 14.

"Jacobson Textron HR–5111—4WD Hydraulic Rotary Mower" (advertising brochure) published by Jacobson Div. Of Textron, Inc. in 1994.

"Groundsmaster® 580–D Mowers" (advertising brochure) published by Toro. (date unknown).

"The Articulator", Model 425D (advertising brochure) published by LasTec, Inc. (date unknown).

"The Articulator", Model 325ER (advertising brochure) published by LasTec, Inc. (date unknown).

"The Articulator", Model 325E (advertising brochure) published by LasTec, Inc. (date unknown).

GANG-TYPE ROTARY LAWN MOWER WITH REAR ROLLER

This is a continuation of U.S. patent application Ser. No. 08/794,141, filed Feb. 3, 1997, now U.S. Pat. No. 6,047,530.

BACKGROUND OF THE INVENTION

The invention relates to rotary lawn mowers and to gang-type lawn mowers.

Historically, reel mowers have been used to cut golf course roughs. It is generally recognized that rotary mowers are better suited for cutting tall grass, where scalping is not a problem, while reel mowers are better for shorter cutting. A gang of reels can be either attached directly to the frame on which the operator rides, or pulled behind a tractor. Pull-behind or tow-behind rotary gangs are also known. These can be driven either by a power takeoff or by a separate engine. Tow-behind gangs, whether reel or rotary, are generally undesirable for cutting a golf course rough because close trimming is difficult. Thus, rotary mowers have not been used to cut golf course roughs, which require close trimming and the ability to cut undulating terrain at a relatively short length.

SUMMARY OF THE INVENTION

The invention provides a gang-type rotary lawn mower suitable for cutting a golf course rough. This is a tremendous improvement over the known prior art, because a rotary mower typically requires substantially less maintenance than a reel mower. The lawn mower has single-spindle cutting decks attached directly to the frame on which the operator rides, with a front row of two or more cutting decks in front of the front wheels, and with a rear row of one or more cutting decks between the front and rear wheels. The invention also provides an improved arrangement for mounting a rotary cutting deck on a lawn mower frame. Each deck is mounted on its own lifting arm so that the deck can move vertically relative to the frame and can pivot relative to the frame about three mutually perpendicular axes.

More particularly, the invention provides a gang-type rotary lawn mower comprising a frame supported by front and rear wheels, an operator's seat mounted on the frame, at least two side-by-side front cutting deck assemblies mounted on the frame in front of the front wheels, and at least one rear cutting deck assembly mounted on the frame behind the front wheels and in front of the rear wheels. Each of the front and rear deck assemblies includes a pair of laterally-spaced, generally vertically-extending side plates, front wheels supporting the side plates for movement over the ground, and a rear roller extending between the side plates and supporting the side plates for movement over the ground. Each deck assembly also includes a single-spindle cutting deck located between the side plates and in front of the roller, the deck being mounted on the side plates such that the height of the deck relative to the ground is adjustable. The roller extends across substantially the entire width of the deck. The roller resists scalping and stripes the grass, both of which are aesthetically desirable.

Each deck assembly is connected to the frame by a generally L-shaped, horizontally-extending lifting arm operable to lift the deck assembly relative to the frame. Each deck assembly is connected to the frame by its own lifting arm. Each lifting arm has an inner end pivotally connected to the frame. A cross member is mounted on the outer end of the lifting arm for pivotal movement about a generally vertical axis and about a generally horizontal axis extending in the forward-rearward direction. One end of the cross member is connected to one of the deck assembly side plates for pivotal movement about a generally horizontal, laterally-extending axis adjacent the forward ends of the side plates, and the other end of the cross member is connected to the other side plate for pivotal movement about the same axis.

This construction enables the lawn mower to cut the undulating terrain of a golf course rough and to be controlled for close trimming. Also, as mentioned above, the lawn mower requires much less maintenance than the reel mowers historically used to cut a golf course rough.

Other features and advantages of the invention will become apparent to those skilled in the art upon review of the following detailed description, claims and drawings.

Figure 1:
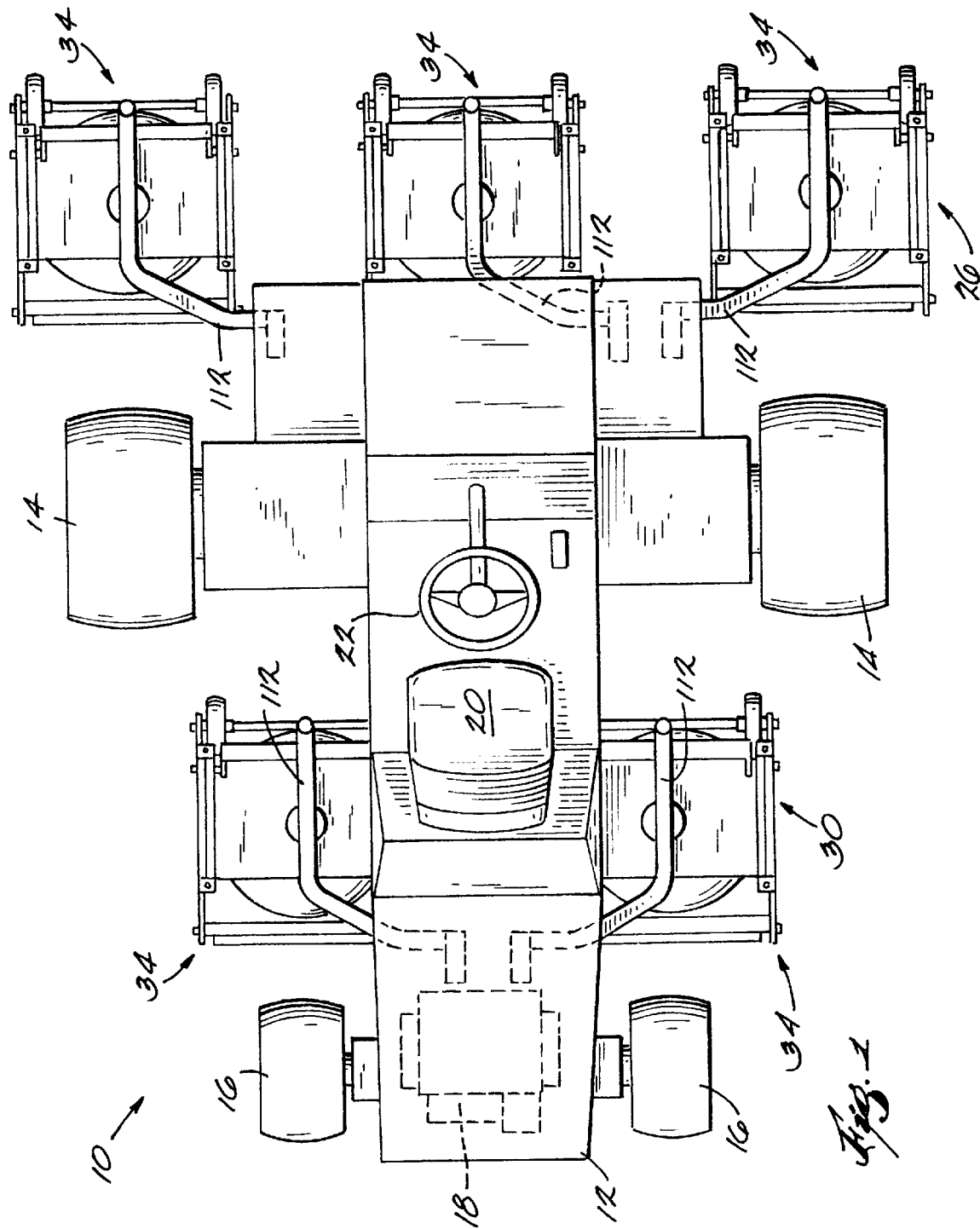
FIG. 1 is a top plan view of a lawn mower embodying the invention.
Figure 2:
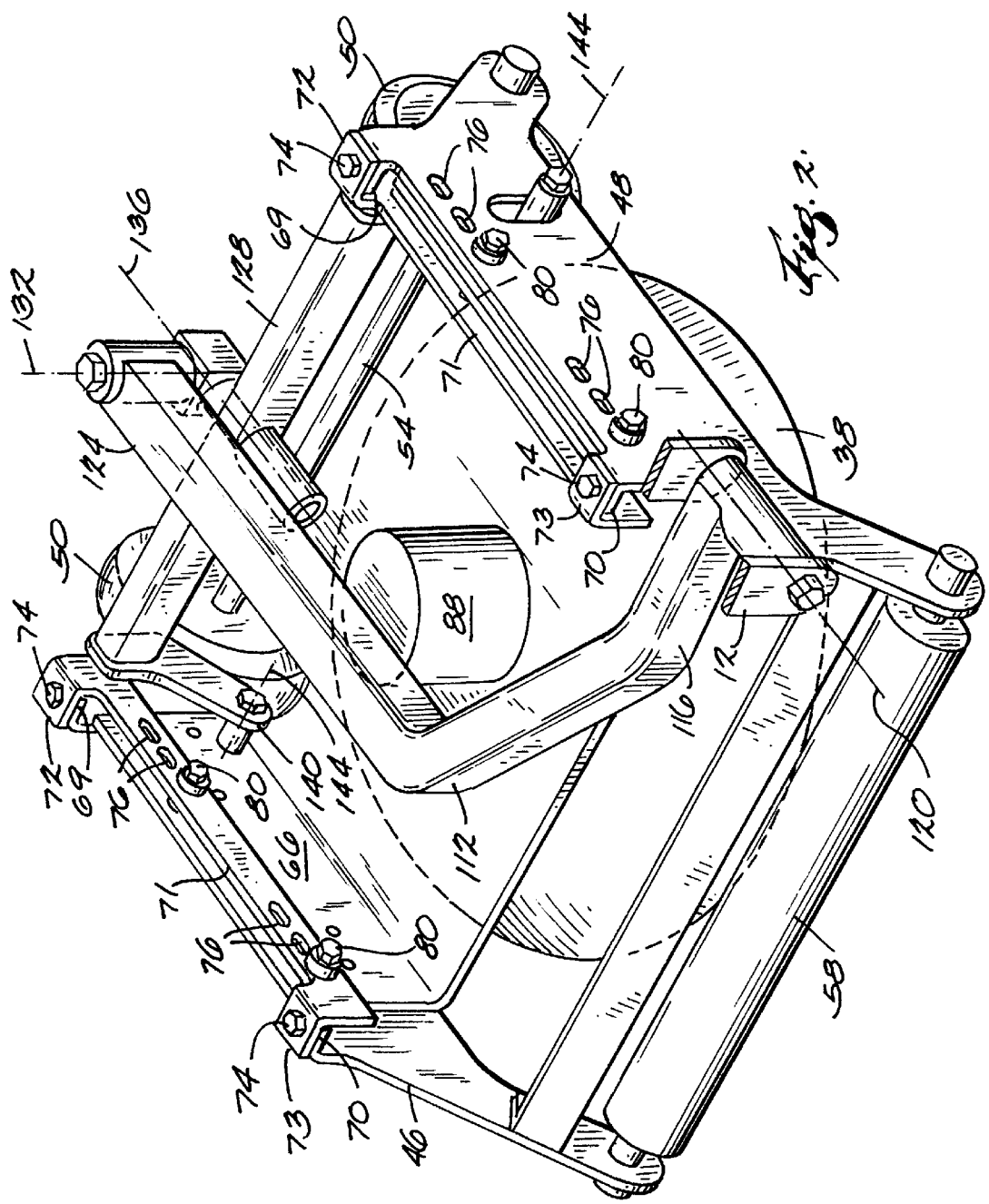
FIG. 2 is a perspective view of a cutting deck assembly.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A lawn mower 10 embodying the invention is illustrated in FIG. 1. Except as described below, the lawn mower 10 is identical to the lawn mower disclosed in U.S. patent application Ser. No. 08/787,389, filed Jan. 22, 1997, titled "PARALLEL-SERIES FOUR-WHEEL-DRIVE HYDRAULIC CIRCUIT FOR A RIDING LAWN MOWER" and assigned to the assignee hereof. The lawn mower 10 comprises a frame 12 (partially shown in FIGS. 2–5) supported by front wheels 14 and rear wheels 16 for movement over the ground. While the illustrated lawn mower 10 is rear-steering and has four-wheel drive, it should be understood that the invention is applicable to front-steering or two-wheel-drive lawn mowers.

The lawn mower 10 further comprises a power source 18 supported by the frame 12. The power source may be any type known in the art, such as a gasoline-powered, internal-combustion engine. The engine drives a hydraulic pump (not shown) that supplies hydraulic fluid to hydraulic motors (not shown) drivingly connected to the wheels 14 and 16. The lawn mower 10 further comprises an operator's seat 20, and a conventional steering system, including a steering wheel 22, enabling the operator to steer the lawn mower 10. In the illustrated construction, the steering system is hydraulic and is connected to the rear wheels 16 to steer the lawn mower 10.

The lawn mower 10 further comprises front and rear rows 26 and 30, respectively, of cutting deck assemblies 34. More particularly, in the illustrated construction, the lawn mower 10 has three side-by-side front cutting deck assemblies 34 in front of the front wheels 14, and two rear cutting deck assemblies 34 behind the front wheels 14 and in front of the rear wheels 16. As is known in the art, each rear deck assembly 34 is aligned with the gap between two adjacent front deck assemblies 34.

Figure 3:
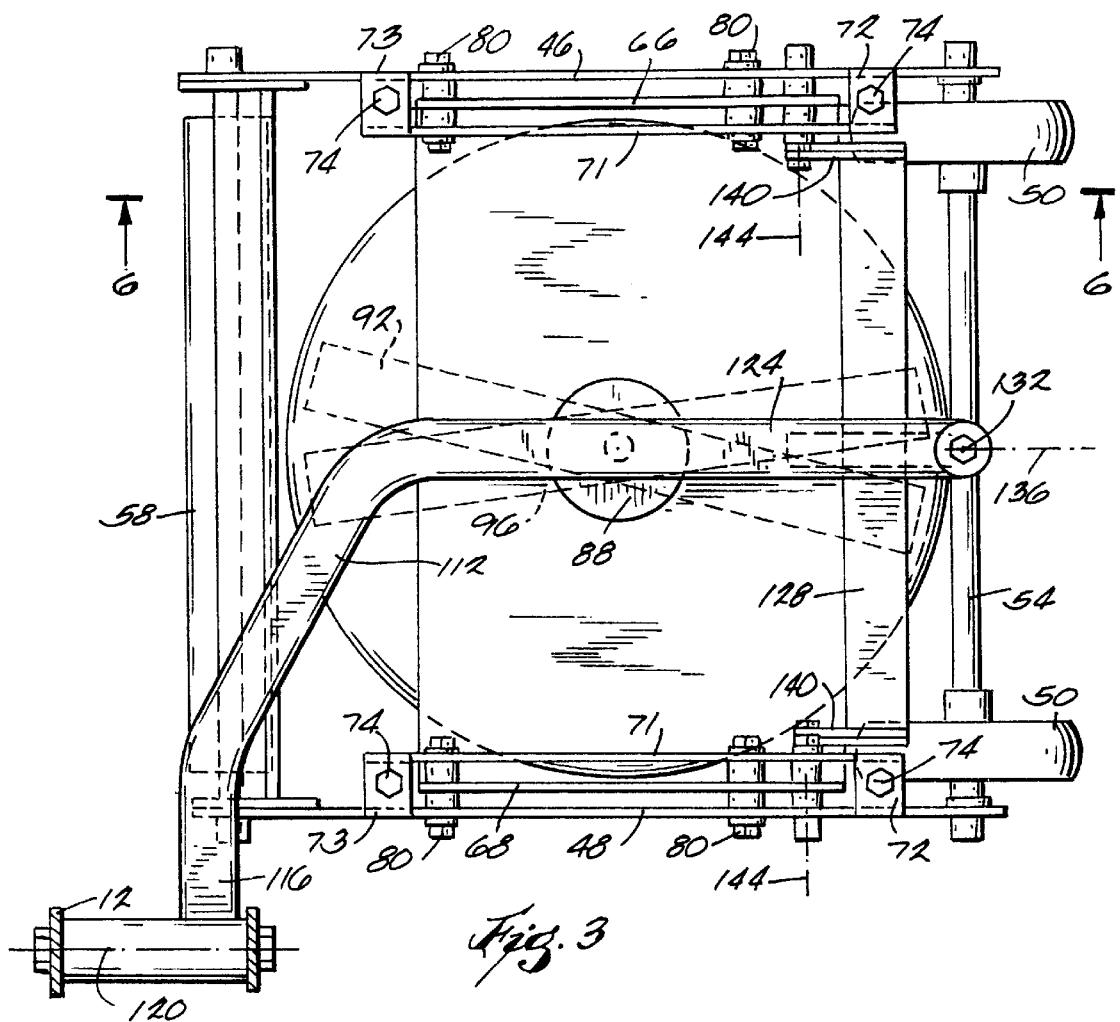
FIG. 3 is a top plan view of the cutting deck assembly.
Figure 4:
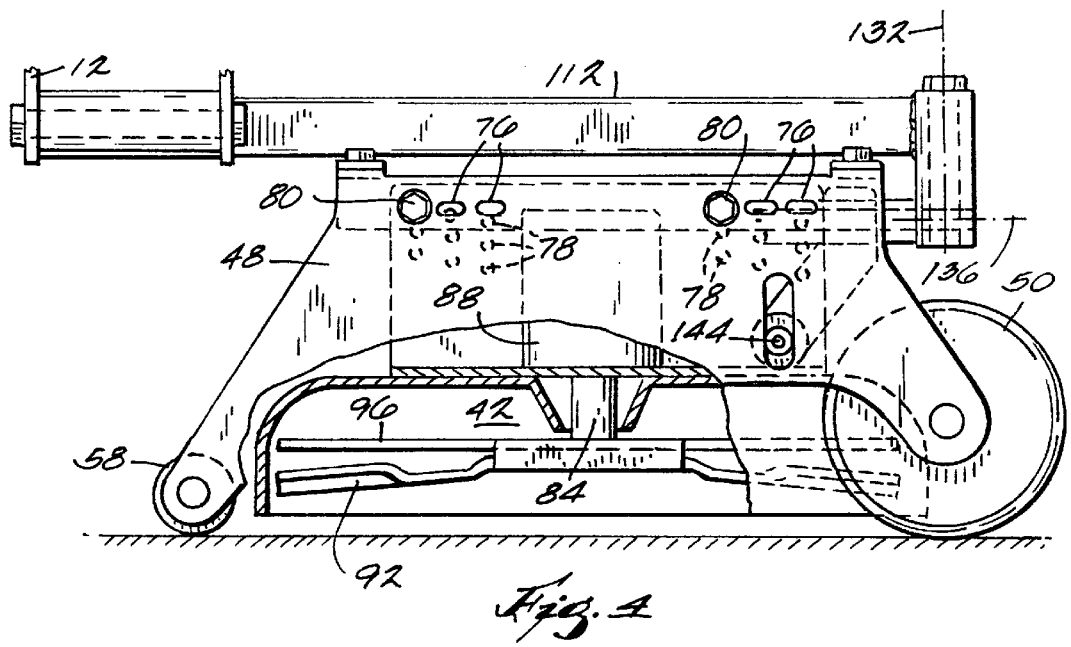
FIG. 4 is a side elevational view of the cutting deck assembly.
Figure 5:
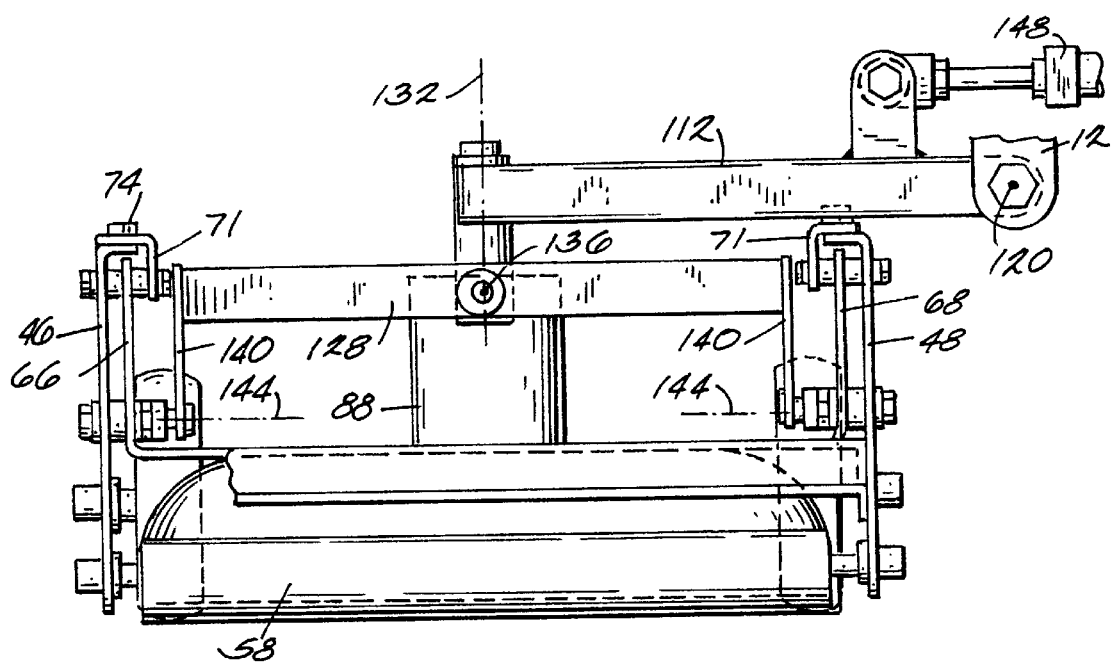
FIG. 5 is a rear elevational view of the cutting deck assembly.

Each of the cutting deck assemblies 34 includes (see FIGS. 2–5) a single-spindle mulching deck 38 defining a downwardly opening space 42 (FIG. 4). The deck 38 is located between and supported by a pair of laterally-spaced, generally vertically-extending side plates 46 and 48. The term "lateral" is used herein to mean the direction from one side of the lawn mower to the other, i.e., perpendicular to the forward-rearward direction. Two front wheels 50 rotate about an axle 54 (FIGS. 2 and 3) extending between the side plates 46 and 48 in front of the deck 38, such that each front wheel 50 supports one of the side plates 46 and 48 and the deck 38 for movement over the ground. A rear roller 58 extends between the side plates 46 and 48 and also supports the side plates 46 and 48 and the deck 38 for movement over the ground. The roller 58 is behind the deck 38 and extends across substantially the entire width of the deck 38. The roller 58 resists scalping and stripes the grass.

Figure 6:
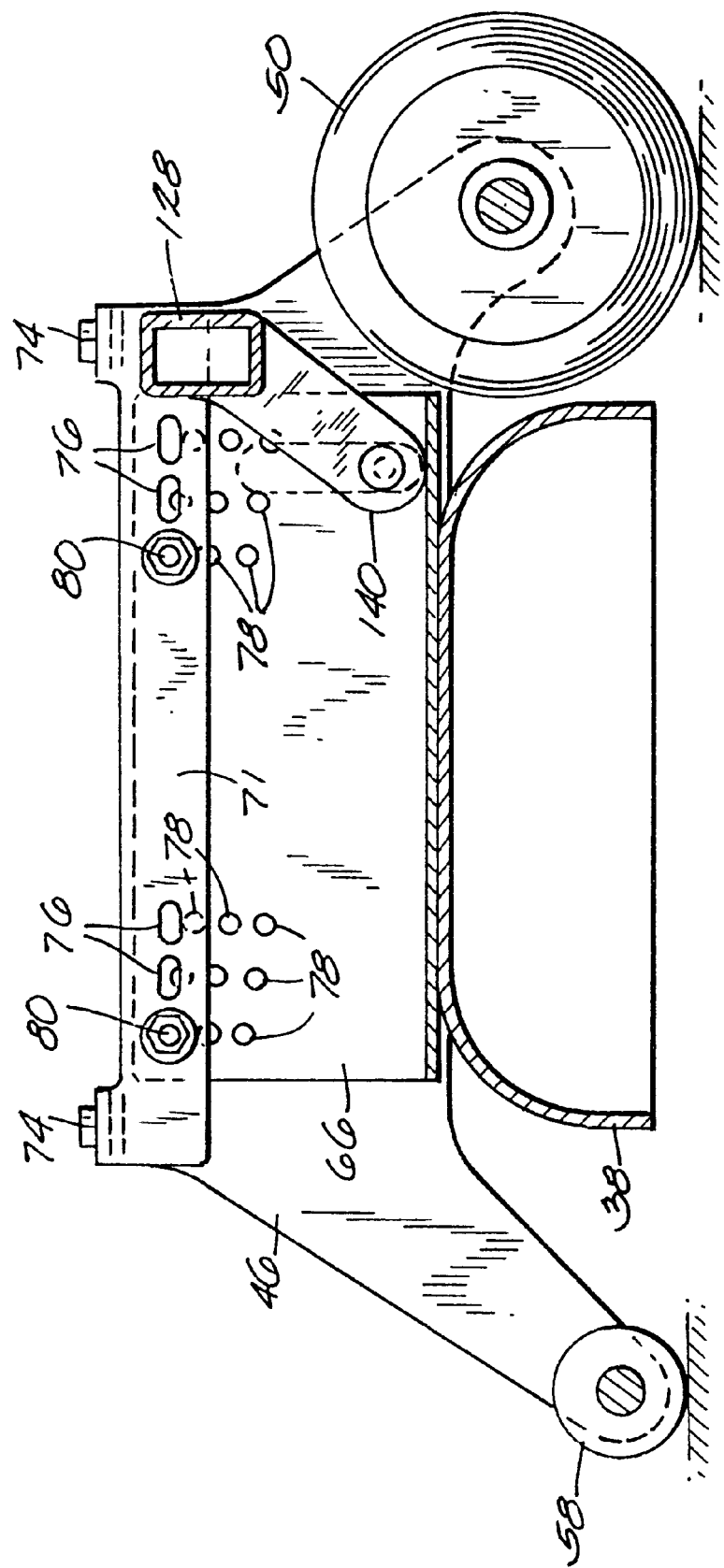
FIG. 6 is a view taken along line 6—6 in FIG. 3.

The deck 38 is mounted on the side plates 46 and 48 such that the height of the deck 38 relative to the ground is adjustable. In the illustrated construction, the deck 38 includes spaced deck plates 66 and 68 (FIGS. 3 and 5) extending upwardly adjacent the side plates 46 and 48, respectively. The upper end of each side plate 46 or 48 has thereon (see FIG. 2) generally horizontal, inwardly-extending ears 69 and 70, with the ear 69 adjacent the front of the side plate and the ear 70 adjacent the rear of the side plate. Fixed to the ears 69 and 70 of each side plate 46 or 48 is an elongated plate member 71 having outwardly-extending ears 72 and 73 respectively secured to the ears 69 and 70 by suitable means such as bolts or screws 74. Each side plate 46 or 48 and the corresponding plate member 71 has therein (see FIGS. 4 and 6) a series of holes 76. Each of the deck plates 66 and 68 has therein several vertically-spaced series of holes 78. Bolts 80 extending through holes 76 in the side plates 46 and 48 and in the plate members 71 and through holes 78 in the deck plates 66 and 68 secure the deck 38 to the side plates 46 and 48. The height of the deck 38 is adjusted by changing the holes 78 in the deck plates 66 and 68 and/or the holes in the side plates 46 and 48 and in the plate members 71 through which the bolts 80 extend.

A single spindle 84 (FIG. 4) is mounted for rotation about a generally vertical axis within the space 42 defined by the deck 38. The spindle 84 is driven by a hydraulic motor 88 on top of the deck 38. The above-mentioned pump supplies hydraulic fluid to the motor 88. It should be understood that other means could be used to drive the spindle 84.

A set of cutting blades is mounted on the spindle 84 for rotation therewith. In the illustrated construction, as shown in FIGS. 3 and 4, each blade set includes a lower, leading blade 92 and an upper, trailing blade 96. The leading blade 92 has a leading cutting edge and an upwardly angled trailing edge or lift. Preferably, the lift of the leading blade 92 is angled upwardly at an angle of approximately forty-five degrees. The trailing blade 96 has a leading cutting edge for cutting clippings deflected upwardly by the lift of the leading blade 92. The blades are preferably identical to those disclosed in U.S. patent application Ser. No. 08/787,383, filed Jan. 22, 1997, titled "ROTARY LAWN MOWER MULCHING DECK" and assigned to the assignee hereof. In alternative embodiments of the invention, different blade arrangements can be employed.

Each of the deck assemblies 34 is mounted on the frame 12 by a generally L-shaped, horizontally-extending lifting arm 112, such that each deck assembly is mounted on its own lifting arm 112. The lifting arm 112 has (see FIGS. 2 and 3) a laterally-extending inner leg 116 with an inner end connected to the frame 12 for pivotal movement about a generally horizontal axis 120 extending in the forward-rearward direction. The arm 112 also has an outer leg 124 extending in the forward-rearward direction. A cross member 128 is mounted on the outer end of the outer leg 124 for pivotal movement about a generally vertical axis 132 and about a generally horizontal axis 136 extending in the forward-rearward direction. Each of the opposite, laterally-spaced ends of the cross member 128 has thereon (see FIGS. 2, 3, 5 and 6) a downwardly and slightly rearwardly extending arm 140. The lower end of one arm 140 is connected to the side plate 46 for pivotal movement about a generally horizontal, laterally-extending axis 144 adjacent the forward ends of the side plates 46 and 48. The lower end of the other arm 140 is connected to the side plate 48 for pivotal movement about the axis 144.

A hydraulic assembly 148 (partially shown only in FIG. 5) connected between the arm 112 and the frame 12 pivots the arm about the axis 120 for lifting and lowering the deck 38. When the deck is lowered for cutting, the hydraulic assembly allows the lifting arm to "float" thereby allowing the deck 38 to move vertically relative to the frame 12. The connection of the deck 38 to the arm 112 via the cross member 128 allows the deck 38 to pivot relative to the frame 12 about the three mutually perpendicular axes 132, 136 and 144. This mounting arrangement enables the deck 38 to adjust to undulating terrain, thereby substantially avoiding scalping.

It should be understood that the lawn mower 10 could have only two or more than three cutting decks in the front row, and only one or more than two cutting decks in the rear row. Also, other arrangements could be used to mount the decks on the frame 12.

Various features of the invention are set forth in the following claims.

What is claimed is:

1. A gang-type rotary lawn mower comprising
   a frame supported by wheels for movement over the ground,
   a power source which is mounted on the frame and which drives at least two of the wheels,
   an operator's seat mounted on the frame,
   a steering system enabling the operator to steer the lawn mower,
   at least two side-by-side front rotary cutting deck assemblies mounted on the frame, the front deck assemblies defining a gap between adjacent front deck assemblies, and
   at least one rear rotary cutting deck assembly mounted on the frame behind the front deck assemblies, each rear deck assembly being aligned with a respective gap between adjacent front deck assemblies,
   each of the front and rear deck assemblies including a single-spindle cutting deck defining a downwardly opening space, a single spindle mounted for rotation about a generally vertical axis within the space, and at least one cutting blade mounted on the spindle for rotation therewith.

2. A gang-type rotary lawn mower comprising:
   a frame supported by front and rear wheels for movement over the ground, a power source which is mounted on said frame and which drives at least two of said wheels, an operator's seat mounted on said frame, a steering system enabling the operator to steer said lawn mower, at least one front rotary cutting deck assembly mounted on said frame in front of said front wheels;

at least one rear rotary cutting deck assembly mounted on said frame behind said front deck assemblies and between said front and rear wheels; and each of said front and rear deck assemblies including a deck defining a downwardly opening space, at least one cutting blade mounted on a spindle for rotation therewith and at least one roller supporting said deck for movement over the ground, said roller extending substantially across the entire width of said deck.

3. A lawn mower as set forth in claim 2 wherein each deck assembly is connected to said frame by a respective lifting arm operable to lift the associated deck assembly relative to said frame, such that each of said deck assemblies is connected by its own lifting arm to said frame.

4. A lawn mower as set forth in claim 2 wherein each of said front and rear deck assemblies includes a pair of laterally-spaced, generally vertically-extending side plates having forward ends, a first front wheel supporting one of said side plates for movement over the ground, and a second front wheel supporting the other of said side plates for movement over the ground, wherein said roller extends between said side plates and supports said side plates for movement over the ground, wherein the associated deck is located between said side plates and in front of said roller and is mounted on said side plates such that the height of said deck relative to the ground is adjustable by changing the position of said deck relative to said side plates.

5. A lawn mower as set forth in claim 2 wherein each deck assembly also includes a hydraulic motor which is mounted on said deck and which is drivingly connected to said spindle.

6. A lawn mower as set forth in claim 2 wherein each deck assembly includes a set of cutting blades mounted on said spindle for rotation therewith, said set of blades including a lower, leading blade having a leading cutting edge and an upwardly angled trailing edge, and an upper, trailing blade having a leading cutting edge for cutting clippings deflected upwardly by said upwardly angled trailing edge of said leading blade, said trailing blade extending at a non-perpendicular angle relative to said leading blade so that clippings coming off said trailing edge of said leading blade are cut immediately by said trailing blade before said clippings start swirling around within said space.

7. A lawn mower as set forth in claim 2 wherein at least two front rotary cutting deck assemblies are mounted on said frame in a side-by-side relationship defining a gap between adjacent front deck assemblies.

8. A lawn mower as set forth in claim 7 wherein at least one rear deck assembly is aligned with said gap.

9. A lawn mower as set forth in claim 2 wherein each of said front and rear deck assemblies is pivotable relative to said frame about three mutually perpendicular axes.

10. A gang-type rotary lawn mower comprising:

a frame supported by front and rear wheels for movement over the ground;

a power source which is mounted on said frame and which drives at least two of said wheels;

an operator's seat mounted on said frame;

a steering system enabling the operator to steer said lawn mower;

at least two front rotary cutting deck assemblies mounted to said frame in front of said front wheels and in a side-by-side relationship, wherein each of said front cutting deck assemblies defines a front cutting path; and at least one rear rotary cutting deck assembly being mounted on said frame behind said front deck assemblies, said rear rotary cutting deck assembly defining a rear cutting path extending laterally to overlap a portion of each of said front cutting paths, wherein each of said front and rear deck assemblies has at least one cutting blade mounted on a spindle for rotation therewith and at least one roller to support each of said deck assemblies for movement over the ground, said roller extending substantially across the entire width of said cutting path.

11. A lawn mower as set forth in claim 10 wherein each deck assembly is connected to said frame by a respective lifting arm operable to lift the associated deck assembly relative to said frame, such that each of said deck assemblies is connected by its own lifting arm to said frame.

12. A lawn mower as set forth in claim 10 wherein each of said front and rear deck assemblies includes a pair of laterally-spaced, generally vertically-extending side plates having forward ends, a first front wheel supporting one of said side plates for movement over the ground, and a second front wheel supporting the other of said side plates for movement over the ground, wherein said roller extends between said side plates and supports said side plates for movement over the ground, wherein the associated deck is located between said side plates and in front of said roller and is mounted on said side plates such that the height of said deck relative to the ground is adjustable by changing the position of said deck relative to said side plates.

* * * * *

(12) INTER PARTES REEXAMINATION CERTIFICATE (0415th)
United States Patent
Bednar

(10) Number: US 6,336,311 C1
(45) Certificate Issued: Aug. 7, 2012

(54) GANG-TYPE ROTARY LAWN MOWER WITH REAR ROLLER

(75) Inventor: Richard D. Bednar, Lake Mills, WI (US)

(73) Assignee: Textron Innovations Inc., Providence, RI (US)

Reexamination Request:
No. 95/000,245, Apr. 26, 2007

Reexamination Certificate for:
Patent No.: 6,336,311
Issued: Jan. 8, 2002
Appl. No.: 09/546,145
Filed: Apr. 10, 2000

Related U.S. Application Data

(63) Continuation of application No. 08/794,141, filed on Feb. 3, 1997, now Pat. No. 6,047,530.

(51) Int. Cl.
*A01D 34/66* (2006.01)

(52) U.S. Cl. ............................................ 56/6; 56/13.6
(58) Field of Classification Search ..................... None
See application file for complete search history.

(56) References Cited

To view the complete listing of prior art documents cited during the proceeding for Reexamination Control Number 95/000245, please refer to the USPTO's public Patent Application Information Retrieval (PAIR) system under the Display References tab.

*Primary Examiner* — Jeffrey R. Jastrzab

(57) ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

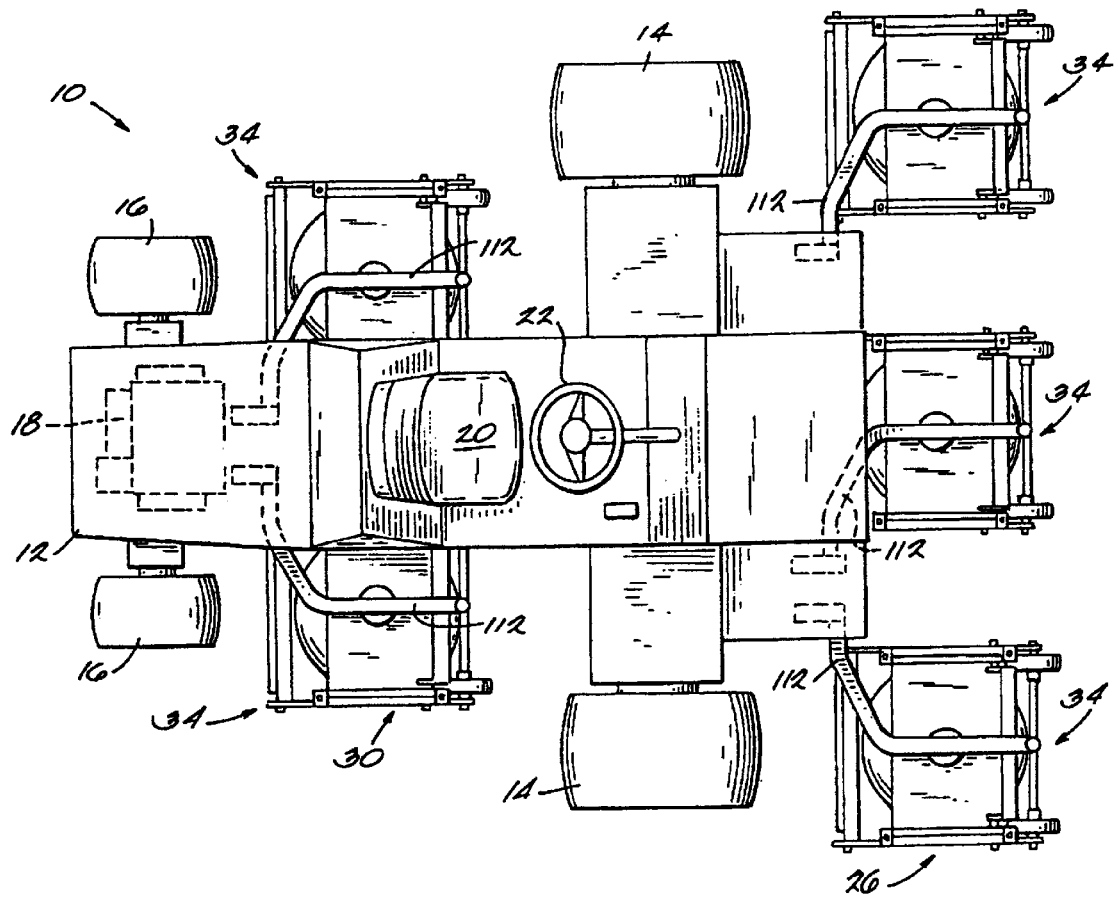

US 6,336,311 C1

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 2-5, 7, 8 and 10-12 is confirmed.

Claim 1 is cancelled.

New claims 13-21 are added and determined to be patentable.

Claims 6 and 9 were not reexamined.

13. A gang-type rotary lawn mower comprising:
   a frame supported by wheels for movement over the ground,
   a power source which is mounted on the frame and which drives at least two of the wheels,
   an operator's seat mounted on the frame,
   a steering system enabling the operator to steer the lawn mower,
   at least two side-by-side front rotary cutting deck assemblies mounted on the frame, the front deck assemblies defining a gap between adjacent front deck assemblies,
   at least one rear rotary cutting deck assembly mounted on the frame behind the front deck assemblies, each rear deck assembly being aligned with a respective gap between adjacent front deck assemblies,
   each of the front and rear deck assemblies including a single-spindle cutting deck defining a downwardly opening space, a single spindle mounted for rotation about a generally vertical axis within the space, and at least one cutting blade mounted on the spindle for rotation therewith,
   each of the deck assemblies is connected to the frame for pivotal movement about a generally horizontal axis in the forward-rearward direction and for pivotal movement about the generally horizontal, laterally-extending axis, and
   a roller behind each deck and extending at least partially across the width of the deck, the roller supporting the deck for movement over the ground.

14. A gang-type rotary lawn mower comprising:
   a frame supported by wheels for movement over the ground,
   a power source which is mounted on the frame and which drives at least two of the wheels,
   an operator's seat mounted on the frame,
   a steering system enabling the operator to steer the lawn mower,
   at least two side-by-side front rotary cutting deck assemblies mounted on the frame, the front deck assemblies defining a gap between adjacent front deck assemblies,
   at least one rear rotary cutting deck assembly mounted on the frame behind the front deck assemblies, each rear deck assembly being aligned with a respective gap between adjacent front deck assemblies,
   each of the front and rear deck assemblies including a single-spindle cutting deck defining a downwardly opening space, a single spindle mounted for rotation about a generally vertical axis within the space, at least one cutting blade mounted on the spindle for rotation therewith, and a rear roller extending at least partially across the width of the deck, the roller supporting said deck for movement over the ground, and
   the cutting deck further comprising a first deck plate extending upwardly adjacent a first side of the deck and a second deck plate extending upwardly adjacent a second side of the deck.

15. The gang-type rotary lawn mower of claim 14, wherein the downwardly opening space is circular.

16. The gang-type rotary lawn mower of claim 14, wherein each of the front and rear deck assemblies further comprises:
   a first generally vertically-extending side plate positioned adjacent the first deck plate and a second generally vertically-extending side plate positioned adjacent the second deck plate;
   a first plate member positioned adjacent the first side plate and a second plate member positioned adjacent the second side plate; and
   at least a first bolt extending through holes in the first side plate, the first deck plate and the first plate member and at least a second bolt extending through holes in the second side plate, the second deck plate and the second plate member.

17. The gang-type rotary lawn mower of claim 16, wherein the first and second side plates are positioned outwardly of the first and second deck plates, respectively.

18. The gang-type rotary lawn mower of claim 16, wherein the first and second plate members are positioned inwardly of the first and second deck plates, respectively.

19. A gang-type rotary lawn mower comprising:
   a frame supported by wheels for movement over the ground,
   a power source which is mounted on the frame and which drives at least two of the wheels,
   an operator's seat mounted on the frame,
   a steering system enabling the operator to steer the lawn mower,
   at least two side-by-side front rotary cutting deck assemblies mounted on the frame, the front deck assemblies defining a gap between adjacent front deck assemblies,
   at least one rear rotary cutting deck assembly mounted on the frame behind the front deck assemblies, each rear deck assembly being aligned with a respective gap between adjacent front deck assemblies,
   each of the front and rear deck assemblies including a single-spindle cutting deck defining a downwardly opening space, a single spindle mounted for rotation about a generally vertical axis within the space, and at least one cutting blade mounted on the spindle for rotation therewith, and
   a roller supporting each of the front and rear deck assemblies, the roller extending substantially across the entire width of the deck supporting the deck for movement over the ground.

20. A gang-type rotary lawn mower as recited in claim 19, wherein each deck assembly is connected to the frame by a respective lifting arm operable to lift the associated deck assembly relative to the frame, such that each of the deck assemblies is connected by its own lifting arm to the frame.

21. A lawn mower as set forth in claim 19, wherein each of the front and rear rotary cutting deck assemblies includes a

*pair of laterally-spaced, generally vertically-extending side plates having forward ends, a first front wheel supporting one of the side plates for movement over the ground, and a second front wheel supporting the other of the side plates for movement over the ground, wherein the roller extends between the side plates and supports the side plates for movement over the ground, wherein the associated deck is located between the side plates and in front of the roller and is mounted on the side plates such that the height of the deck relative to the ground is adjustable by changing the position of the deck relative to the side plates.*

\* \* \* \* \*